United States Patent Office 3,809,630
Patented May 7, 1974

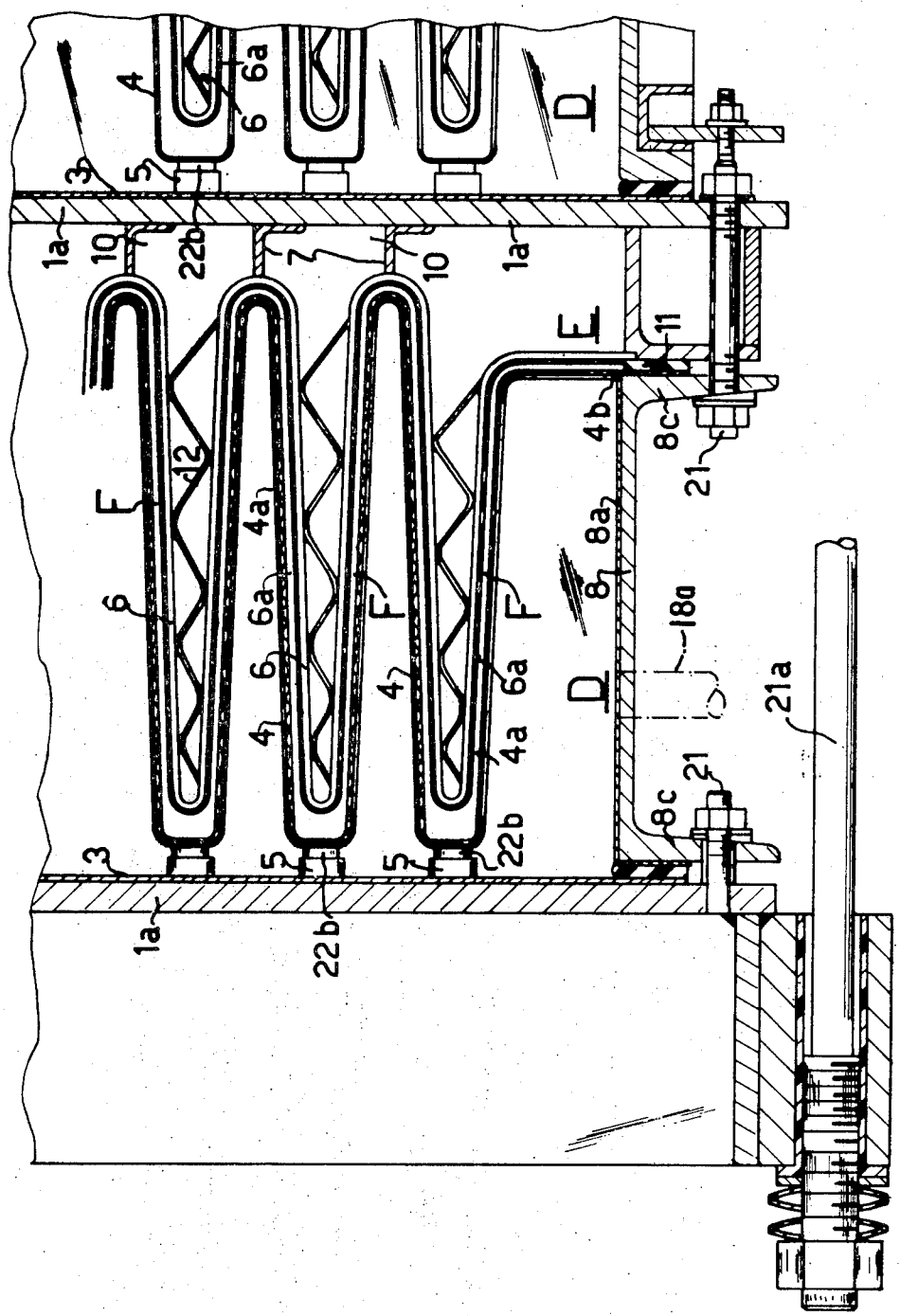

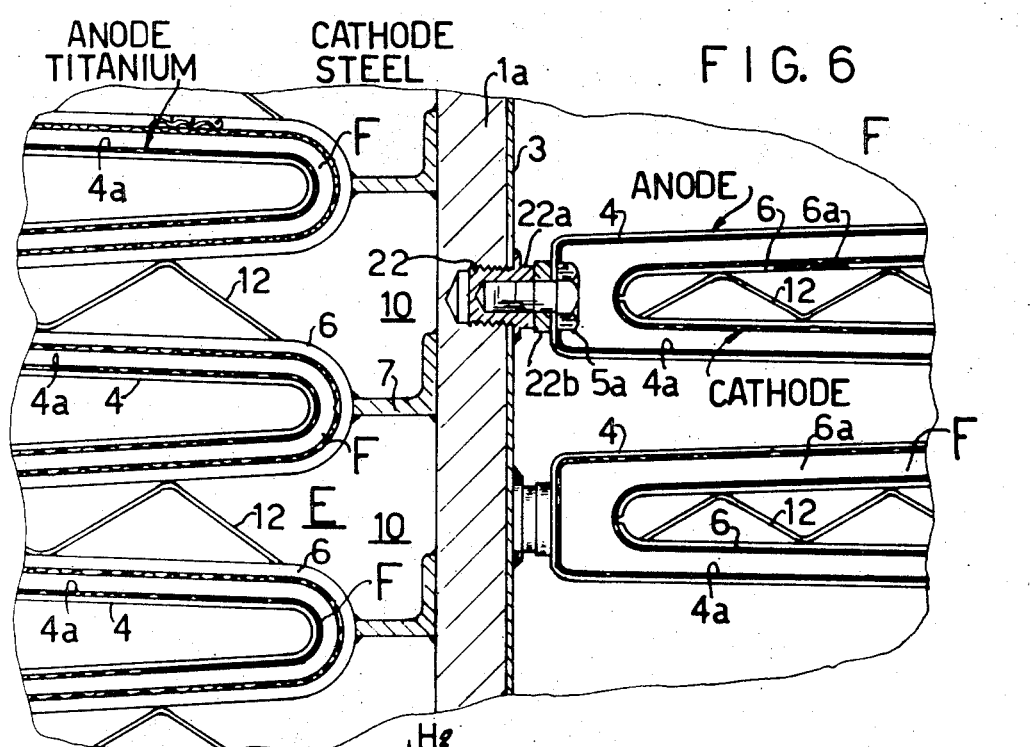
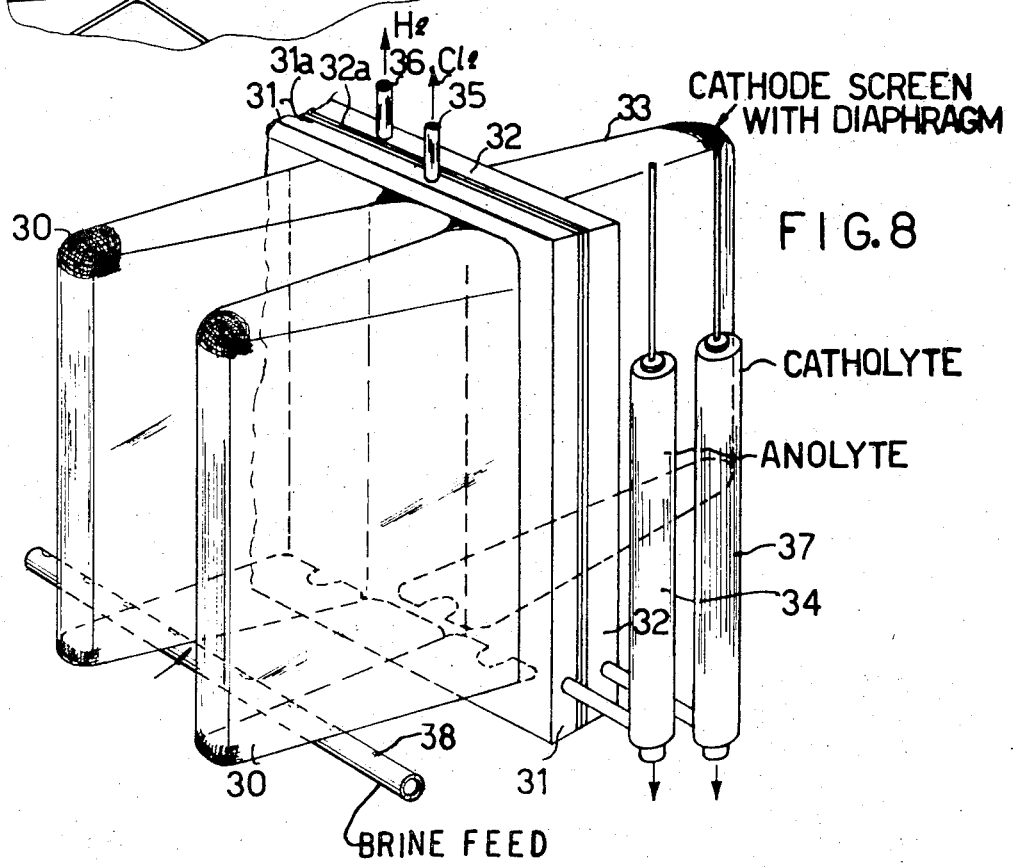

3,809,630
ELECTROLYSIS CELL WITH PERMEABLE VALVE METAL ANODE AND DIAPHRAGMS ON BOTH THE ANODE AND CATHODE
Oronzio de Nora, Milan, Italy, and Vittorio de Nora, Nassau, Bahama Islands, assignors to Oronzio de Nora Impianti Elettrochimici S.p.A., Milan, Italy
Continuation-in-part of application Ser. No. 51,162, June 20, 1970. This application Feb. 17, 1972, Ser. No. 227,116
Claims priority, application Italy, Oct. 19, 1971, 30,038/71
Int. Cl. C01d 1/06
U.S. Cl. 204—98
18 Claims

ABSTRACT OF THE DISCLOSURE

Describes an electrolysis cell, and method of operating the cell, having permeable valve metal anodes (preferably titanium or tantalum) and permeable metal cathodes in wave form, each with closed ends and each covered by diaphragms, with the waves of the cathode fingers lying between the waves of the anode fingers to provide a large electrode area in a small cell container. The anodes and cathodes in wave form are intermeshed together and the cell may be unipolar, or bipolar with terminal positive and negative end cell units and a plurality of intermediate cell units. The anolyte and cathoylte discharge means are adjustable in order to control the anolyte and catholyte liquor levels behind each diaphragm.

---

This application is a continuation-in-part of our co-pending application Ser. No. 51,162, filed June 20, 1970.

This invention relates to electrolysis cells having dimensionally stable valve metal anodes and cathodes which are permeable to electrolyte flow therethrough and in which both the anodes and cathodes are provided with permeable diaphragms of asbestos or similar material through which the electrolyte can flow.

Permeable cathodes, consisting of cathode screens covered with diaphragms have long been used in electrolysis cells to separate the cathode gases and liquids from the electrolyte. For example, in the electrolysis of sodium chloride in diaphragm cells to produce chlorine and caustic soda, chlorine is released at the anodes and is recovered from the anode compartments and sodium is released at the cathodes and forms sodium hydroxide and hydrogen in the cathode comparements, the hydrogen gas, sodium hydroxide (approximately 11–12% strength) and depleted brine are recovered from the cathode compartments. This invention also uses diaphragms over permeable valve metal anodes so that brine from the electrolyte inlet compartment can be flowed through both the diaphragm covered permeable anodes and the diaphragm covered cathodes and different gas and/or liquid products recovered from both the anode and cathode compartments.

This invention will be described with reference to the production of chlorine and caustic soda from sodium chloride brine, but it is to be understood this is only for purposes of illustration and that the inventions herein described may be used for the electrolysis of other alkali halides, for the electrolysis of sodium and potassium sulfates to produce caustic soda or caustic potash, sulfuric acid and oxygen, for electro-osmosis and electrodialysis, for organic oxidation and reduction reactions, for electrometallurgical uses and for other processes which may be carried out by electrolysis reactions in the cell and process herein described.

The electrodes may be either unipolar or bipolar as will be described, provided both the anodes and cathodes are permeable and at least one is covered with a diaphragm.

One of the objects of this invention is to provide new types of permeable anodes and cathodes, each covered with a diaphragm in which the diaphragm covered anodes and cathodes are in wave or finger form with the cathode waves lying between the anode waves so that electrolyte can be flowed into the interelectrodic gap between the anode and cathode surfaces and flowed through the cathode diaphragm to the catholyte compartment and through the anode diaphragm to the anolyte compartment, the cathodic products being released in the catholyte compartment and the anodic products being released in the anolyte compartment.

Another object of the invention is to provide an apparatus and process in which the liquid level in each of the electrolyte, anolyte and catholyte compartments can be controlled to give the desired flow rate through each of the anodè and cathode diaphragms.

Various other objects and advantages of this invention will appear as this description proceeds.

Referring now to the drawings, which show various concrete and diagrammatic embodiments of the invention for the purpose of illustration:

FIGS. 5 and 6 are detail cross sectional plan views of the anode-cathode connections in a bipolar cell;

FIG. 8 is a digarammatic perspective view of a portion of another form of bipolar anode and cathode showing the connection therebetween.

In the cells hereinafter described, the anodes are constructed of a valve metal (titanium, tantalum, zirconium, tungsten or the like) which is resistant to the corrosive conditions of an electrolysis cell and which will pass current in the cathode direction but will not pass current in the anode direction, hence the name "valve" metal. The valve metals used in these cells are provided with an electrically conducting electrocatalytic coating of a platinum group metal or mixed oxides of valve metals and platinum group metal oxides, or other electrically conducting electrocatalytic coatings. The platinum group metals are platinum, palladium, osmium, iridium and ruthenium. The preferred valve metal is titanium provided with a coating of a mixed oxide of titanium and ruthenium. However, other valve metals and other electrocatalytic coatings may be used.

The anodes may be formed of titanium screen, perforated titanium sheets, slitted, reticulated titanium plates, titanium mesh, rolled titanium mesh, woven titanium wire or screen, titanium rods, or similar tantalum or other valve metal plates and shapes, or alloys of titanium or other valve metals, all of which forms will be referred to herein as "titanium mesh," and normally have from 30 to 60% (preferably 50 to 53%) of openings therethrough so that when covered by diaphragms the electrolyte can readily flow through these anodes.

Figure 1:
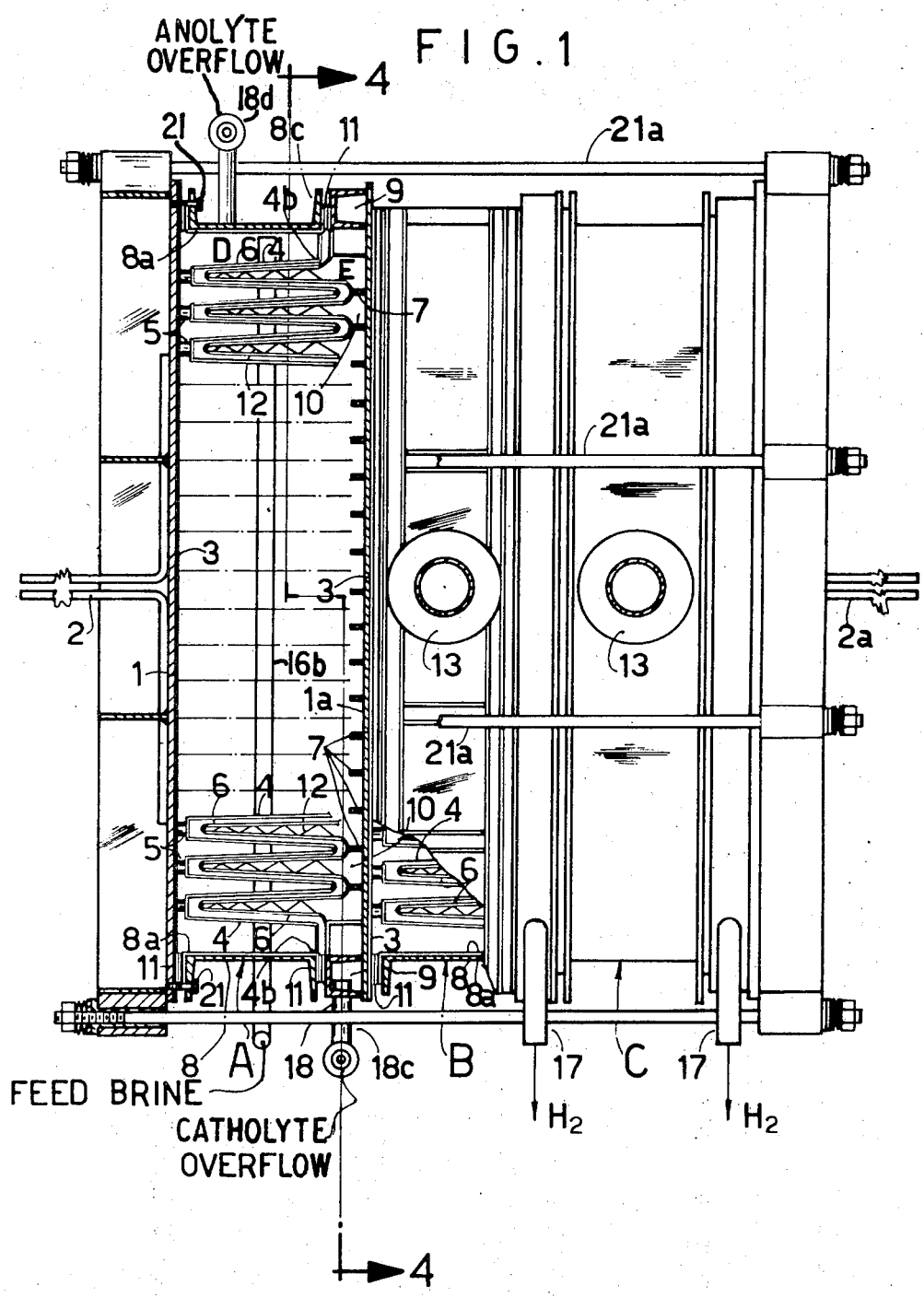
FIG. 1 is a plan view with parts broken away, and parts shown in dash lines of a three unit bipolar cell constructed according to the principles of this invention.

Referring now to the embodiments of this invention illustrated in FIGS. 1 to 7 of the drawings, FIG. 1 illustrates a three unit bipolar cell having a terminal positive end unit A, an intermediate unit B and a terminal negative end unit C. Only one intermediate unit B has been illustrated, but it will be understood that any number of intermediate units B, B, etc., may be used. The unit A consists of a positive (anode) end plate 1, preferably of steel, to which the positive electrical connections 2 are secured. The plate 1 is provided with a titanium, tantalum or other valve metal lining 3 which is resistant to the electrolyte and the electrolysis conditions encountered in the cell and titanium mesh anode waves or fingers 4 with closed ends are connected to the titanium lining by titanium connectors 5, illustrated in greater detail in FIGS. 5 and 6 and described in detail below, which insure good electrical connections between the end plate 1 and the anode waves or fingers 4. The titanium or other valve metal lining 3 is secured to the end plate 1 by sandwich welding, using intermediate sandwich metals if necessary, or by bolting or any other connection which insures a good metal to metal electrical contact between the end plates 1 and the electrolyte resistant lining 3. Titanium, tantalum or other valve metals or alloys of these metals may be used for the lining 3 and the anode waves or ringers 4.

Figure 9:
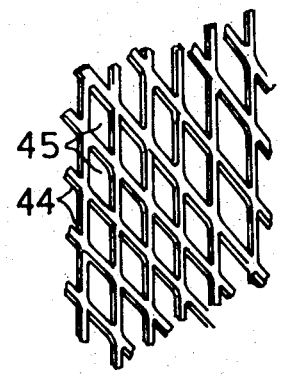
FIG. 9 is a perspective illustration of one form of open titanium mesh suitable for use in the cells of this invention.

The anode waves 4 are formed from open mesh titanium, tantalum or other valve metal as diagrammatically illustrated in FIG. 9, and are completely covered with a diaphragm usually of asbestos fiber deposited under vacuum on the open mesh anode structure, or of woven asbestos cloth. Before application of the diaphragms, the titanium or other valve metal anodes are given an electrically conducting electrocatalytic coating of a platinum group metal or a mixture of oxides of a valve metal and a platinum group metal. The mixed oxide coating may be applied as a solution of the desired ingredients and applied as a paint, spray or the like and baked on the anodes. Usually multiple coats are applied and baked in air at about 350° to 450° C. between each coat to deposit the materials in solution and to oxidize the materials to the corresponding oxides of valve metals and platinum group metals. The coatings may be applied to the front (facing cathode) or back of the anodes or to both the front and back, or may be applied to only a portion of the anode faces.

Figure 2:
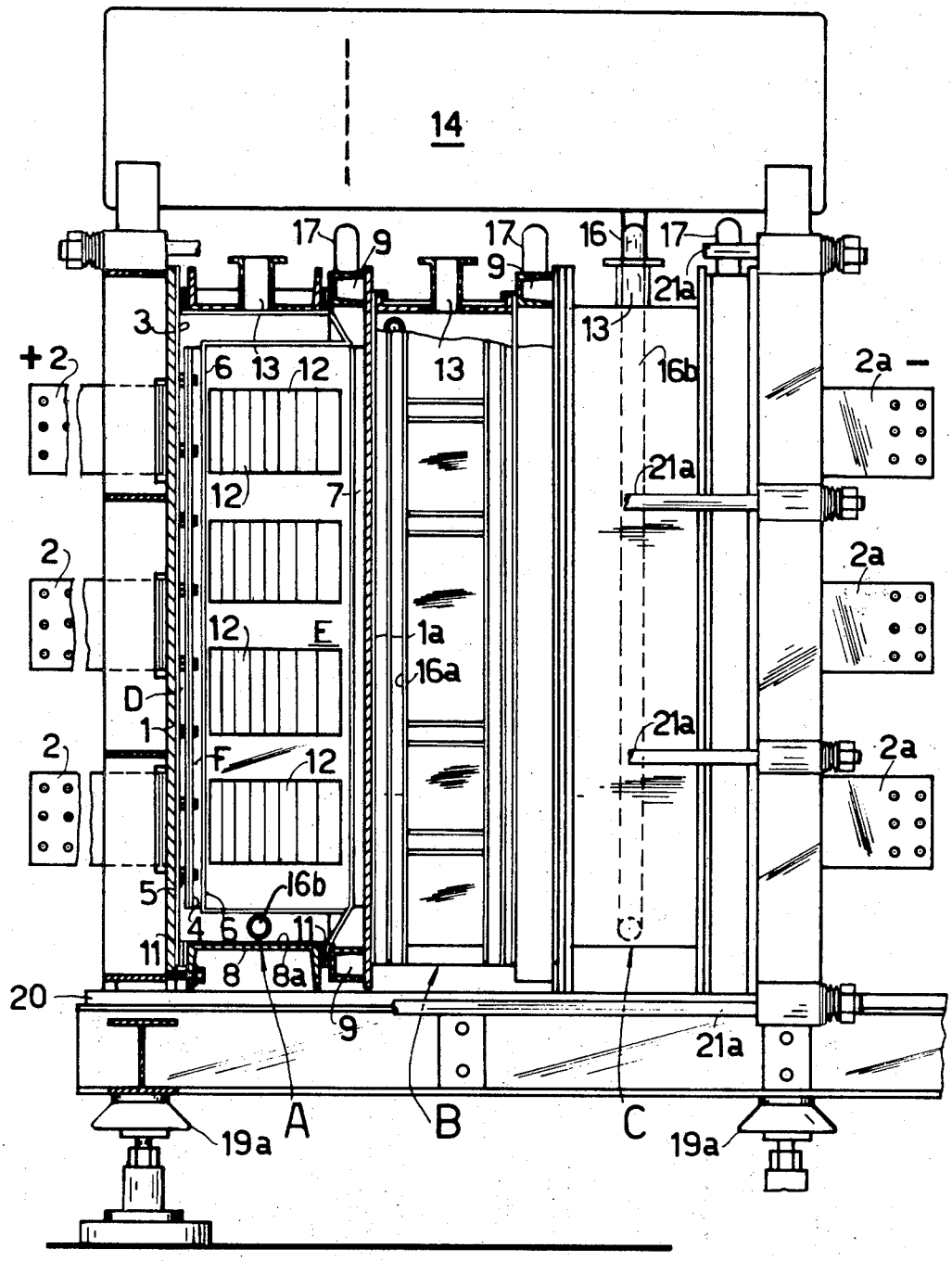
FIG. 2 is a part sectional side view, with parts broken away and parts shown in dash lines, of the cell illustrated in FIG. 1.
Figure 7:
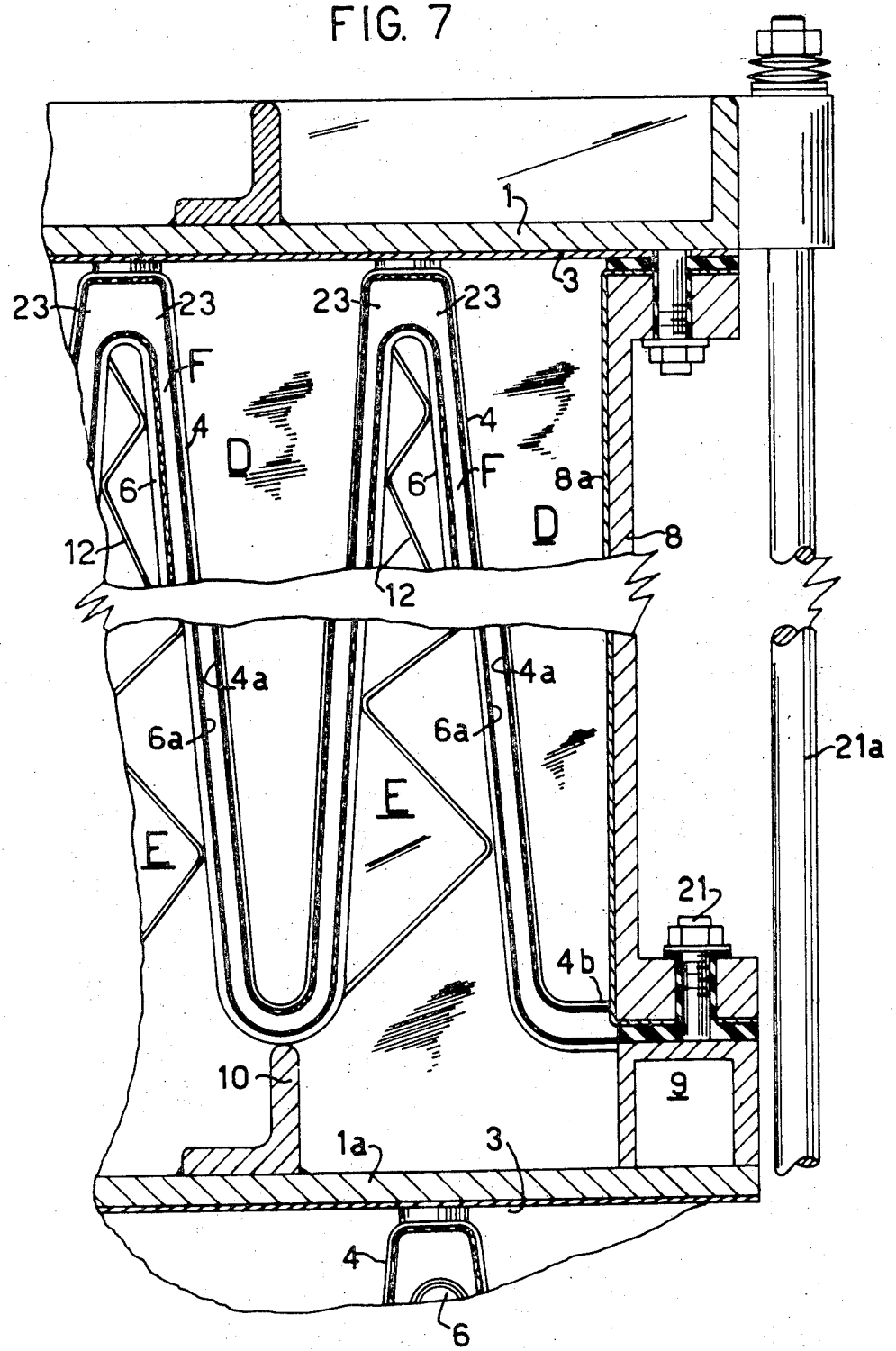
FIG. 7 is an enlarged sectional plan view similar to FIGS. 5 and 6, showing the diaphragms on both the anode and cathode fingers with the electrolyte being fed into the cell between the two diaphragms.

The entire surface of the coated anodes facing the cathodes is covered by diaphragms, not shown in FIGS. 1 and 2, but indicated by 4a in the FIGS. 5, 6 and 7.

Figure 4:
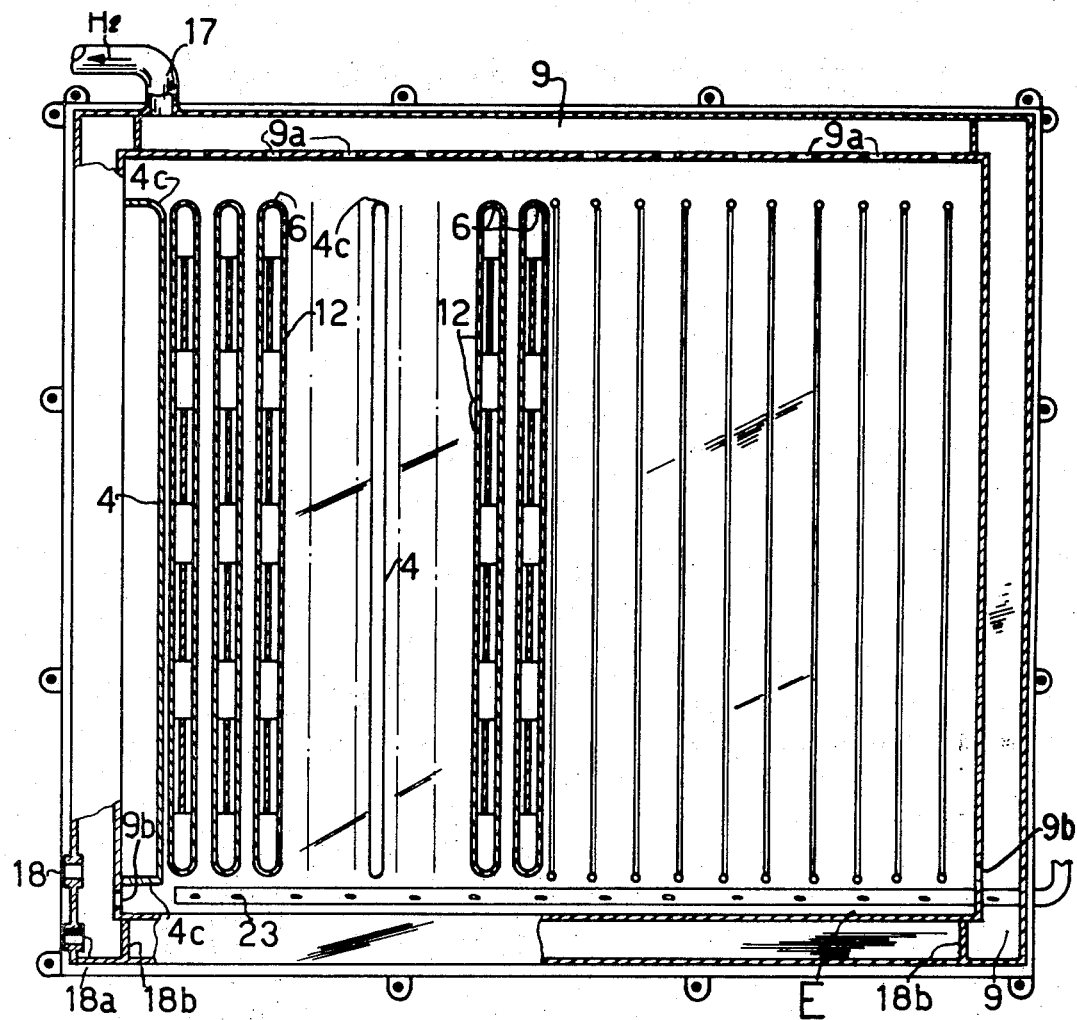
FIG. 4 is a cross sectional view, approximately on the line 4—4 of FIG. 1.

The end anode plate 1 is spaced from a steel cathode supporting end plate 1a, from which the steel screen cathode waves or fingers are supported by welded strips or projections 7 which form the electrical connection between the cathode fingers and the steel plate 1a. Each cathode supporting end plate 1a (except the negative terminal end plate) is provided on the anodic side, with a valve metal lining 3 as shown in FIGS. 1, 5 and 6 to form a bimetallic partition between each of the bipolar cell units. A spacer 8 forming the side walls of each cell unit, extends between the lining 3 and a squared pipe 9 which surrounds the catholyte compartment 10 formed between the inside of the cathode fingers 6 and the plate 1a. The spacers 8 are lined with a titanium lining 8a or other valve metal or electrolyte resistant lining which is resistant to the anolyte and the corrosive conditions encountered in an electrolytic cell, and the end anode waves 4 are connected to the lining 8a as indicated at 4b (FIGS. 1, 5 and 7). Alternatively, the end anode waves 4 may project into the space between the flanges 8c of the spacers 8 and the gaskets 11. Rubber gaskets 11 seal the joints between the plates 1 and 1a and the flanges 8c of the spacers 8 so that a fluid-tight box-like structure housing the anode waves 4 and the cathode waves 6 is formed between the plates 1 and 1a in each of units A, B and C of the bipolar cell. Inside each cathode finger 6, zigzag bent steel reinforcements 12 are welded at spaced intervals to prevent collapse of the screen cathode waves or fingers 6 when an asbestos or other diaphragm material is deposited on the screen cathode fingers under vacuum. Similar reinforcements (not shown) may be provided on the inside of the anode waves away from the cathodes to prevent collapse of the mesh anode waves when diaphragm material is applied thereto. The steel screen cathode waves or fingers 6 are closed at the top and bottom as illustrated in FIG. 4 and are covered with a diaphragm material 6a (FIGS. 5 and 6), usually either woven asbestos fiber or asbestos flock applied under vacuum.

The diaphragm material covers the side walls as well as the top and bottom of cathode waves or fingers 6. The titanium mesh anode waves 4 between each cathode wave 6 are likewise closed at the top and bottom as indicated at 4c on the end anode and on the one intermediate anode 4 shown in FIG. 4, to prevent the electrolyte from entering the anolyte compartments behind the diaphragm covering on the anodes 4. Only one end anode wave and one intermediate anode wave 4 has been shown in FIG. 4, but it will be understood that there are anode waves between each cathode wave as illustrated in FIG. 4. The diaphragms on the anode and cathode waves are only partially and diagrammatically shown in FIGS. 5 and 6, but it will be understood that both the anode and cathode waves are completely covered with diaphragms when in use in the cells. The diaphragms separate the anolyte compartments D and the catholyte compartments E from the electrolyte or brine compartment or interelectrodic gap F (FIGS. 5, 6 and 7) and keep the gases and liquids in each of these compartments separate.

The brine or electrolyte is fed into the interelectrodic gap F between the anodes and cathodes and flow through the diaphragms 4a and 6a into the anolyte compartments D and catholyte compartments E and the gases and liquids in the anolyte and catholyte compartments are separately recovered as described below.

Figure 3:
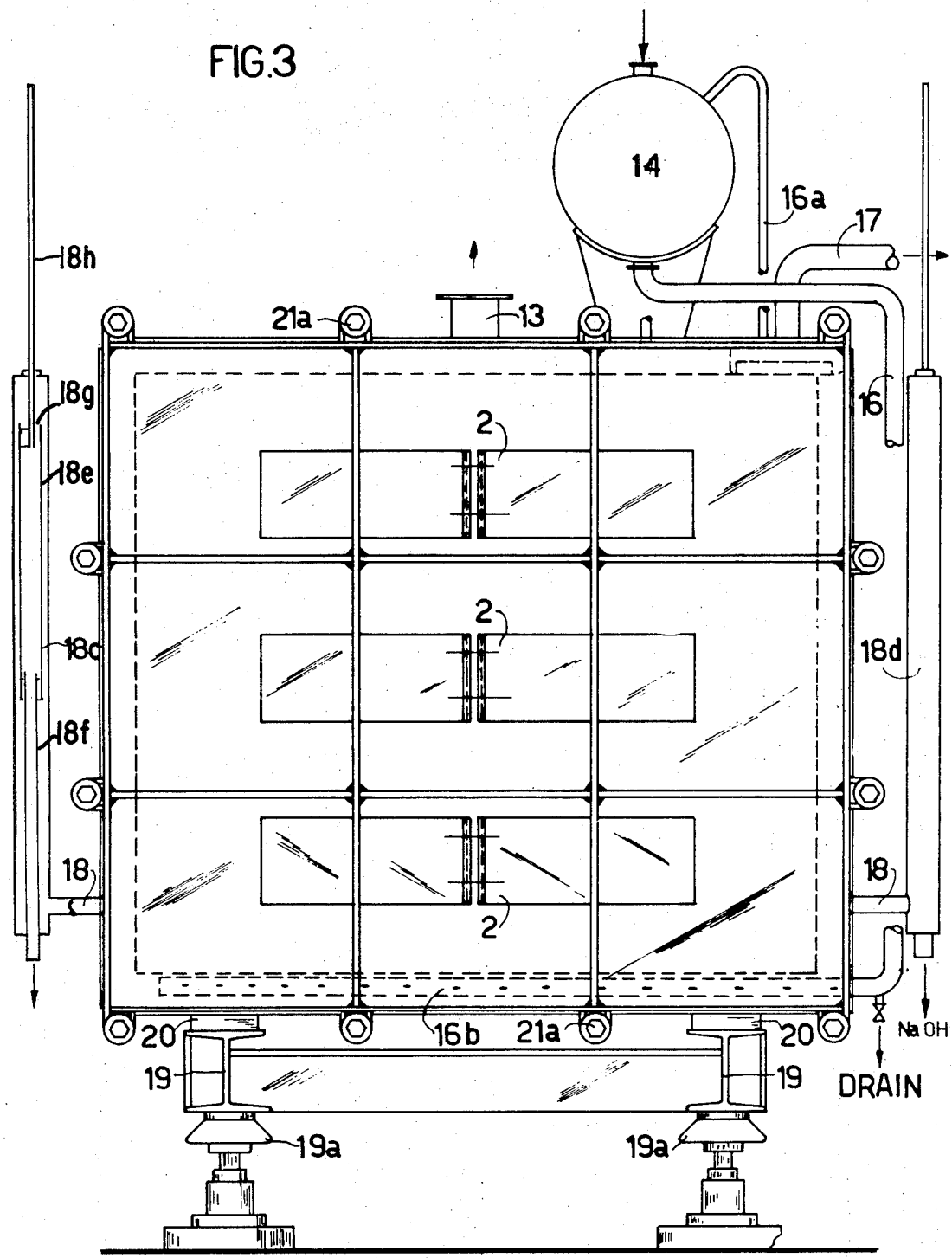
FIG. 3 is a partial front view of the three unit bipolar cell illustrated in FIGS. 1 and 2, also with parts shown in dash lines.

When the cell illustrated in FIGS. 1 to 3 is in use, the electrolyzing current flows through the electrolyte in the interelectrodic gap F from the anode waves 4 to the cathode waves 6. Anodic gases are released at the anode waves or fingers 4, behind the diaphragms 4a, the electrolyte or brine flows through the diaphragms surrounding both the anode waves 4 and cathode waves 6 and the cathodic gases and liquids formed at the cathode surfaces inside the diaphragms are discharged from the cathodic compartments through the outlets 17 and 18. The anodic gases and liquids are discharged through the outlets 13 and 40.

When used for the production of chlorine and caustic soda from sodium chloride brine, chlorine (or other anodic gases) released at the anodes 4 rises through the anolyte and escapes through the chlorine outlet 13 to the chlorine recovery system. Saturated brine flows from brine container 14 through pipe connections 16 and feed branches 16b shown in dash lines in FIG. 3 into the space between the anodes 4 and cathodes 6. The feed brine is fed into the lowest part of spaces F between the diaphragm covered anode and cathode fingers of the cell units A, B and C, so that the flow of saturated brine in the interelectrodic gap is from the bottom upward.

Brine is fed continuously or as needed from the saturated brine system into the brine containers 14 and a sight glass 16a (FIG. 3) indicates the level of the brine in the brine container 14. The space between the anodes and cathodes is continuous from side 8 to side 8 of each cell unit as illustrated in FIGS. 1, 2, 5, 6 and 7, so that the saturated brine flows into the interelectrodic gap F between the anodes 4 and cathodes 6 and completely fills this space.

The brine containers 14 provide a hydrostatic pressure head of electrolyte in space F of each electrolyzer.

Sodium hydroxide and hydrogen released at the cathode fingers flows into the catholyte space E behind the cathode diaphragms surrounding the cathode fingers 6 and the end plates 1a and into a squared pipe 9 (FIG. 4) which surrounds the catholyte space. The hydrogen flows upward through the holes 9a at the top of the squared pipe 9 and out through the hydrogen outlets 17 and the depleted brine containing the sodium hydroxide (about 11-12%) flows through the holes 9b to the catholyte outlet 18. The squared pipes 9 communicate only with the catholyte compartment E as shown in FIGS. 1 and 2. An electrolyte drain 18a near the bottom of the square pipe 9 permits the catholyte compartment, as well as the anolyte compartment and the interelectrodic gap space of each cell unit, to be drained. Partitions 18b at each end of the bottom leg of squared pipe 9 seal off the bottom leg, so that no electrolyte enters the bottom leg of squared pipe 9. A telescoping pipe connection 18c (FIG. 3) communicating with the catholyte outlet 18 is adjustable to control the level of the catholyte in the catholyte compartments E, so that the catholyte level is always sufficiently below the electrolyte level in space F to insure a sufficient flow from the electrolyte compartments or interelectrodic gap space F through the diaphragms into the catholyte compartments E. In a similar way, a telescoping tube connection 18d maintains the level of the anolyte in the anolyte compartments D sufficiently below the level of the brine in the interelectrodic gap to insure flow through the anode diaphragms 4a. The telescoping drain pipes 18c and 18d are of the same construction and each can be adjusted by moving the upper section 18e upwardly on the lower section 18f to adjust the overflow height 18g, so that the level of the anolyte or catholyte in the compartment D or E is below the level of the brine in the gap F. A hollow tube 18h connected to the upper section 18e permits this adjustment and serves to break any syphon effect in the telescoping drain pipes 18c and 18d. In place of the telescoping pipes, the usual inverted U-shaped perk tube may be used to control the anolyte and catholyte level in the compartments D and E.

The cell units A, B, B, B and C are mounted on I-beam supports 19 (FIG. 3), supported on insulators 19a. Syenite plates 20 cemented to the upper faces of the I-beams 19 insulate the titanium lined boxes of the cell units A, B and C from the metal I-beams and permit the heavy elements of the cell units to slide on the syenite plates 20 without too great friction during assembly or disassembly of the units. The sides 8 and the ends 1 and 1a are held together by tie rods 21a, suitably insulated from their surrounding parts by means of insulating bushings, as shown in FIGS. 1 and 5. The temporary bolts 21 shown in FIG. 5 are used only during assembly of the electrolyzer, to tighten the units together and are taken off before start up of the cell in order to avoid short circuits. During operation of the cell, the tie rods 21a, suitably insulated from their surrounding parts, hold the terminal end plates 1 and 1a and the side spacers 8, forming the electrolyte box of each cell unit, together. The tie rods 21a extend from the positive terminal end plate 1 of unit A to the negative terminal end plate 1a of the terminal unit C, regardless of the number of intermediate units B in the bipolar cell assembly.

The electrolyzing current flows consecutively from the positive terminal 2 through the end unit A, through the intermediate units B, which vary in number from one to twenty or more, depending on the size and use of the bipolar cell, and through the terminal unit C to the negative terminal 2a of the circuit. The diaphragm covered anode waves or fingers 4 are preferably made of titanium mesh, suitably coated with an electrocatalytic conductive coating such as a platinum group metal or mixed oxides of titanium and platinum group metal oxides. Other valve metals and other coatings may be used. The cathode waves or fingers 6 are preferably steel screen material or other ferrous metal similar to the cathode screens now used in diaphragm cells. However, other metals may be used for the anode and cathode waves depending on the material to be electrolyzed and the end products to be produced.

The anodes 4 and cathodes 6 are preferably formed as uniform waves or fingers nested together and uniformly spaced apart, as illustrated in FIGS. 1, 5, 6 and 7, to provide a substantially uniform electrode gap between the anodic surfaces and the cathodic surfaces. During assembly, the anode waves 4 and cathode waves 6 may be moved together by moving the plates 1 and 1a with the anodes and cathodes mounted thereon horizontally toward each other, to form the nesting anode and cathode waves as illustrated in FIGS. 1, 2, 5, 6 and 7, or, by giving a slight taper in the vertical direction to the anode and cathode waves, the anodes and cathodes may be nested together by vertically inserting the cathode waves between the anode waves. The anode waves 4 and cathode waves 6 need not be as long or deep as illustrated. Shallower waves may be used, but the deeper waves illustrated provide greater anode and cathode surfaces within cell units of the same square area than shallower waves would provide. Flat planar anodes and cathodes could be used but would not provide as large area as the wave form.

The words "waves" or "fingers" wherever used in the specification or claims are intended to describe the wave embodiments of FIGS. 1 to 7 or the finger embodiment of FIG. 8.

To insure good electrical connection between the anodic and the cathodic sections of the cell, the anodic metals, such as titanium, tantalum and other valve metals, are preferably sandwich welded to the steel plates 1 and 1a constituting the anodic and cathodic pole of any single cell unit, using appropriate intermediate metals, such as copper, lead, silver, zinc, etc., to form the sandwich weld, if necessary. Other means which will provide good electrical connections may be used.

As illustrated in FIG. 5, the anodes waves 4 are connected to the titanium lining plate 3 by titanium or other cylinders 5 welded to the plate 3. The cylinders 5 are screw threaded on the inside and titanium bolts 5a (FIG. 6) are used to connect the anodes waves 4 to the cylinders 5 and plate 3, using titanium strips 22b, where the titanium anodes are welded on. The steel cathode waves 6 are connected to the plates 1a by steel strips 7 welded to the plates 1a and to the trough of the waves 6. The anode and cathode waves are entirely covered with a diaphragm material, such as woven asbestos, asbestos fibers or the like, partialy illustrated at 4a and 6a in FIGS. 5, 6 and 7. A modified form of connection between the steel plates 1a and the anode waves is illustrated in FIG. 6, in which holes 22 are drilled part-way through plates 1a and screw threaded. Hollow titanium bolts 22a are screwed into these holes and, after tightening, are welded to the titanium plate 3 to insure a fluid tight connection, and titanium bolts 5a are used to connect the titanium strips with the trough of anode waves 4 and with the hollow titanium bolts 22a. Titanium strips 22b distribute the current to the anode waves 4. The titanium anode waves 4 may be solid titanium sheet, perforated titanium sheet, slitted, reticulated titanium plates, titanium mesh, rolled titanium mesh, woven titanium wire or screen, horizontally or vertically arranged titanium rods or bars or similar tantalum and other valve metal plates and shapes or alloys of titanium or other valve metals, or any other conductive form of titanium and the waves 4 are provided with a conductive electrocatalytic coating capable of preventing the titanium from becoming passivated, and when used for chlorine production are capable of catalyzing discharge of chloride ions from the surfaces of the anodes. The coating may be on either one or both faces of the anode waves and is preferably on the face of the anode waves 4 facing the cathodes 6.

The diaphragms on the anode waves 4 and the cathode waves 6 keep the anolyte liquor and catholyte liquor separated by cell liquor in the interelectrodic gap F between the diaphragms. The brine or electrolyte undergoing electrolysis is flowed into the space F between the anode diaphragms and the cathode diaphragms and the anolyte liquor and gaseous anode products flowed out from the outside of the anode fingers or waves, as the gaseous and liquid cathode products are flowed out from the outside of the cathode fingers in the embodiments of FIGS. 1 to 7 described above.

It is also possible to use a diaphragm only on the anodes 4, in which event the anolyte gases and liquids are separated from the catholyte gases and liquids only by the diaphragms 4a.

In the diagrammatic illustration of FIG. 8, the perforated or reticulated titanium anode waves or fingers 30 are mounted in the front of a titanium hollow box 31 with which the hollow insides of the fingers 30 communicate. The back of the box 31 is a sheet of titanium 31a which is welded, bolted or otherwise secured to the back 32a of the steel box 32 to which the screen cathode fingers 33 are secured. The interior of the diaphragm covered cathode fingers communicates with the interior of steel box 32 and the interior of the diaphragm covered anode fingers communicates with the interior of the titanium box 31. Each anode-cathode assembly illustrated in FIG. 8 is enclosed in a surrounding box or frame (not shown) similar to the box or frame 8 in FIG. 1. While only two anode fingers 30 and one cathode finger 33 are shown in FIG. 8, it will be understood that a plurality of anode and cathode fingers are used and that these fingers mesh as illustrated in FIGS. 1, 5, 6 and 7. In a complete cell according to FIG. 8, the anode and cathode fingers are meshed together to form intermediate cell units and terminal positive and negative end plates are provided to form a bipolar cell containing the anode and cathode sets illustrated in FIG. 8.

Brine enters the space between the anode and cathode fingers at brine inlet 38 diagrammatically illustrated in FIG. 8 and flows out through the diaphragm covered anode fingers 30 and through the nested diaphragm covered cathode fingers 33 (not shown), facing the anode fingers 30 at the left side of FIG. 8. The brine feed lines 38 are preferably located under the anode and cathode fingers and feed brine into the interelectrodic gap between the diaphragms on the anode and cathode fingers. Chlorine formed at the anodes flows out box 31 at the chlorine outlet 35 and the depleted brine flows from the outlet 34 through a telescoping tube similar to 18c previously described, which controls the anolyte level in the anolyte compartments. Hydrogen released inside the diaphragms at the cathode fingers 33 flows out of outlet 36 and sodium hydroxide (11–12%) and depleted brine flow from the outlet 37, also provided with a telescoping tube to control the catholyte level in box 32.

The compartments housing the anodes 30 are preferably titanium lined as described in connection with FIGS. 1 and 5, and the anodes are titanium provided with an electrically conducting electrocatalytic coating.

FIG. 9 shows one form of open mesh titanium anode screen 44 having approximately 50 to 53% voids or openings 45, therein. The anodes may be any form of titanium or other valve metal screen mesh or rods and are approximately 1/50 to 1/16 inch in thickness and may be bent to the desired shape or form before or after the electrically conducting electrocatalytic coating is applied thereto.

One coating procedure which may be used on the anodes 4 and 30 is as follows:

The anodes are cleaned by boiling at reflux temperature of 110° C. in a 20% solution of hydrochloric acid for 40 minutes and are then dried and coated as follows:

Titanium trichloride in HCl solution is dissolved in methanol, the $TiCl_3$ is converted to the pertitanate by the addition of $H_2O_2$. This conversion is indicated by a change in color from $TiCl_3$ (purple) to $Ti_2O_5$ (orange). An excess of $H_2O_2$ is used to insure complete conversion to the pertitanate. Sufficient $RuCl_3 \cdot 3H_2O$ is dissolved in methanol to give the desired final ratio of $TiO_2$ to $RuO_2$. The solution of pertitanic acid and ruthenium trichloride are mixed and the resulting solution is applied to one or both sides of a cleaned titanium anode surface by brushing, spraying or the like. The coating is applied as a series of coats with baking at about 350° C. for five minutes between each coat. After a coating of the desired thickness or weight per unit of area has been applied, the deposit is given a final heat treatment at about 450° C. for fifteen minutes to one hour. The molar ratio of $TiO_2$ to $RuO_2$ may vary from 1:1 $TiO_2:RuO_2$ to 10:1 $TiO_2:RuO_2$. The molar values correspond to 22.3:47 weight percent Ti:Ru and 51:10.8 weight percent Ti:Ru.

Anodes produced in this way have high conductivity and electrocatalytic activity in chlorine cells which continue without material diminution over a long period of time.

The thickness of the coating may be varied according to the electrochemical needs. A typical coating to give 46 mg. Ru metal and 80 mg. titanium in the oxide coating for every 6 sq. in. of anode surface may be prepared by using 117.9 mg. $RuCl_3 \cdot 3H_2O$ (39% Ru metal) and 80 mg. of titanium metal as $TiCl_3$ (80 mg. Ti dissolved in dilute HCl sufficiently in excess to maintain acidic conditions). Methanol is added to the titanium trichloride solution and the solution is oxidized with $H_2O_2$ to produce the pertitanate. The resulting solution is painted on a titanium anode substrate in multiple coats with drying or baking at 350° C. for five minutes between each coat. Five to fifteen coats may be required. A final heat treatment at 450° C. for one hour is given to complete the coating. The molar ratio of Ti to Ru or $TiO_2$ to $RuO_2$ in the above coatings is 3.65:1.

In place of ruthenium, any platinum group metal may be used and in place of titanium, tantalum or other valve metals or alloys may be used in the coating formulation. If a platinum group metal coating is used on the anode mesh surfaces, it may be applied by electro-deposition or chemi-deposition.

Valve metal anodes coated as described have the property of converting chloride ions (anions) discharged at the anode to chlorine molecules according to the reaction $$2Cl^- \rightarrow Cl_2 + 2e$$

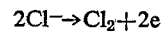

The chlorine molecules, as bubbles, rise along the back of the anodes or are swept off the anodes by the flow of electrolyte through the diaphragms and rise in the anolyte compartments D to the top of the cell units and escape through $Cl_2$ passages 13 to the chlorine recovery system.

The concrete and diagrammatic embodiments of the invention shown herein are for illustrative purposes only and various modifications and changes may be made within the spirit and objects of the invention. The cells illustrated may be used as unipolar single cells or as bipolar multiple cells and white titanium and steel have been described as the metals of construction, various dissimilar metals may be used for the anodes and cathodes of the cell units. Examples of other suitable anode metals are lead, silver and alloys thereof and metals which contain or are coated with $PbO_2$, $MnO_2$, $Fe_3O_4$, etc., and examples of other suitable cathode metals are copper, silver, stainless steel, etc. The metals used should be suitable to resist the corrosive or other conditions encountered in the cell when operating on a particular electrolyte.

What is claimed is:

1. The method of carrying out an electrolysis reaction in an electrolytic cell having an anolyte compartment, a catholyte compartment, a permeable anode in said anolyte compartment, a permeable cathode in said catholyte compartment, diaphragms covering each of the anodes and cathodes, means to feed an electrolyte into the interelectrodic gap between the diaphragms on the anodes and cathodes, means to impress an electrolysis current across said gap, means to withdraw anodic gases from the anolyte compartment and adjustable means to withdraw anolyte liquor from the anolyte compartment, adjustable means to withdraw cathodic gases and liquids from the catholyte compartment, which comprises coating the anode with an electrically conductive electrocatalytic coating, covering the anodes and cathodes with diaphragms and passing an electric current through the interelectrodic gap to decompose the electrolyte, catalyzing the formation of anions to gas bubbles on the anode, sweeping the gas bubbles off the anode by the flow of electrolyte through the anode diaphragm and anode, recovering the anodic and cathodic products from the anolyte and catholyte compartments and maintaining the anolyte and catholyte level in the anolyte and catholyte compartments below the electrolyte level in the interelectrodic gap by adjusting said adjustable anolyte and catholyte withdrawal means.

2. The method of claim 1, in which the permeable anode is a valve metal and the electrically conductive electrocatalytic coating contains a material from the group consisting of platinum group metals and compounds of platinum group metals.

3. The method of claim 1, in which the permeable anode is titanium and the electrically conductive electrocatalytic coating comprises a mixture of a valve metal oxide and a platinum group metal oxide.

4. In an electrolysis cell unit, a plurality of permeable metal anodes in wave form, a plurality of permeable metal cathodes in wave form, the said anodes and cathodes extending substantially from the bottom to the top of said cell unit and being nested together to provide a substantially uniform spacing between the anode and cathode surfaces, a valve metal support for said anodes, a ferrous metal support for said cathodes and means to connect said anodes and cathodes in electrical connection to said supports and means to conduct electrolysis current to and from said supports, a diaphragm on said anode waves, a diaphragm on said cathode waves, said diaphragms facing each other, means to feed an electrolyte to the space between said diaphragms in said cell, means to pass an electrolysis current through the electrolyte between said anode and cathode surfaces, means to discharge anodic gases from said cell behind the anode diaphragms, means to discharge the cathodic gases from said cell behind the cathode diaphragms, means to discharge anolyte liquor from said cell behind the anode diaphragms, means to discharge catholyte liquor from said cell behind the cathode diaphragms, both said anolyte liquor and catholyte liquor discharge means being adjustable to control the anolyte and catholyte liquor level behind said diaphragms.

5. The cell of claim 4, in which the anodes are made of titanium and the electrocatalytic coating contains a material from the group consisting of platinum group metals and oxides of platinum group metals.

6. The cell of claim 4, in which a plurality of said cell units are combined into a bipolar electrolysis cell, a continuous bimetallic partition of ferrous metal on the cathode side and a valve metal on the anode side is provided between each cell unit, separating the cathodes and anodes and means are provided to connect the cathodes and the anodes in electrical connection to said partitions.

7. A bipolar electrolyzer according to claim 6, in which a container on the top of each cell unit feeds fresh brine into the cell units between the anode diaphragms and the cathode diaphragms.

8. A bipolar electrolysis cell according to claim 6, in which the cathodes are diaphragm covered steel net and the anodes are titanium mesh provided with a conductive electrocatalytic coating covered by diaphragms.

9. A bipolar electrolysis cell according to claim 8, in which the anodes are in the form of fingers extending from a titanium supporting back plate, the cathodes are in the form of fingers extending from a steel supporting back plate, the anode fingers and the cathode fingers nest together providing a uniform spacing therebetween and the titanium back plate and the steel back plate are secured together to provide a metallic bipolar electrical contact between one cell unit and the adjacent cell unit.

10. A bipolar electrolyzer according to claim 9, in which the cathodic steel back plate is surrounded by a rectangular-shaped steel pipe frame, said frame has a number of holes in its upper horizontal leg for the passage of gas into the horizontal leg and a gas discharge passage from said horizontal leg and one of the side legs of said frame has holes for the passage of catholyte liquor into said side leg and an adjustable catholyte liquor outlet is connected to said side leg.

11. A bipolar electrolysis cell according to claim 9, in which the anode and cathode fingers are formed with closed upper and lower ends.

12. In a bipolar electrolysis cell, a positive end unit containing anodes and cathodes, a negative end unit containing anodes and cathodes and a plurality of intermediate units containing anodes and cathodes, all of said units being connected in series to pass a electrolysis current through all of said cell units, the anodes and cathodes being constructed of permeable metal in the form of finger-like waves which are nested together, a bimetallic separating partition between the cell units, the cathodes of one cell unit being connected to the anodes of the adjacent cell unit by a metal to metal contact through said cell units, diaphragms covering each of said anodes and cathodes, means to feed an electrolyte to the space between said diaphragms, adjustable means to discharge anolyte liquor from each of said cell units behind the anode and diaphragms and adjustable means to discharge catholyte liquor from each of said cell units behind the cathode diaphragms.

13. The electrolysis cell of claim 12, in which the anodes are formed of titanium mesh having an electrocatalytic conductive coating thereon and the cathodes are formed of ferrous metal screens.

14. The cell of claim 12, in which the anodes are supported on a titanium back plate, the cathodes are supported on a ferrous metal back plate and the two back plates are secured together with a metal to metal contact.

15. The cell of claim 14, in which the space between the cathodes and the cathode back plate forms a catholyte chamber and said space is surrounded by a rectangular pipe, said pipe having openings to receive and discharge catholyte gas and openings to receive and discharge catholyte liquor and the space between the anodes and the anode back plate forms an anolyte chamber and means to discharge anodic gases and anolyte liquor from said anolyte chamber.

16. In an electrolysis cell, a first hollow metal box-like support, metal anode fingers supported on and projecting from said first box-like support, diaphragms covering said anode fingers, a second hollow metal box-like support, cathode fingers supported on and projecting from said second box-like support, diaphragms covering said cathode fingers, the said first and second box-like supports being secured together, back to back, in electronically conductive contact, means to feed electrolyte to the space between said diaphragms, adjustable means to discharge anolyte liquor from the first hollow box-like support and adjustable means to dischage catholyte liquor from the second box-like support.

17. The cell of claim 16, in which the first hollow box-like support and the anode fingers supported thereby are made of titanium and the anode fingers have an electrically conducting electrocatalytic coating thereon, the second hollow box-like support and the cathode supported thereby are made of steel.

18. In an electrolysis cell, a plurality of cell units, a rectangular frame around each cell unit, an anode compartment and a cathode compartment in each cell unit, said anode compartments and cathode compartments being separated from the anode and cathode compartments of the adjacent cell units by a continuous bimetallic separating partition of a ferrous metal on the cathode side and a valve metal on the anode side, said frames and the anode and cathode compartments therein being substantially rectangular throughout and extending substantially from top to bottom and from side to side of said cell units, a plurality of valve metal anodes in hollow wave form in each said anode compartment, valve metal electrical connectors between the base of the waves of said anodes and the valve metal of said bimetallic separating partition, said electrical connectors spacing the anodes from the valve metal of said partitions, an electrically conductive electrocatalytic coating on said anode waves, a plurality of metal cathodes in wave form in said cathode compartments, electrical connectors between the base of said cathode waves and the ferrous metal of said bimetallic partitions, said electrical connectors spacing the cathodes from the ferrous metal of said partitions, said anodes and cathodes extending substantially vertically in said compartments substantially from the top to the bottom and from side to side of said compartments, said anodes and cathodes being nested together to provide a substantially uniform spacing between the anode and cathode surfaces, said anodes and cathodes being of open mesh construction, a diaphragm adjacent the anodes, a separate diaphragm adjacent the cathodes, both said diaphragms being between the anodes and cathodes, a lining on the side walls of said anode compartments resistant to the electrolyte and electrolysis conditions, means to feed an electrolyte to said cell between said diaphragms, means to pass an electrolysis current through the electrolyte between said anode and cathode surfaces, means to discharge anodic gases and cathodic gases from said cell, and adjustable means to discharge a catholyte liquor from the cathode compartments of said cell units and adjustable means to discharge anolyte liquor from the anolyte compartments of said cell units.

References Cited

UNITED STATES PATENTS

| | | | |
|---|---|---|---|
| 3,563,878 | 2/1971 | Grotheer | 204—256 |
| 1,815,078 | 7/1931 | Smith | 204—253 |
| 2,786,811 | 3/1957 | Swope | 204—256 |
| 3,425,928 | 2/1969 | Emery et al. | 204—266 |
| 3,632,498 | 1/1972 | Beer | 204—290 F |
| 1,790,248 | 1/1931 | Roth | 204—284 |
| 3,337,443 | 8/1967 | Raetzsch et al. | 204—254 |
| 2,846,384 | 8/1958 | De Nora | 204—129 |

JOHN H. MACK, Primary Examiner

W. I. SOLOMON, Assistant Examiner

U.S. Cl. X.R.

204—128, 255, 256, 263, 266, 283